United States Patent
Hoshide et al.

(10) Patent No.: US 12,126,931 B2
(45) Date of Patent: Oct. 22, 2024

(54) PROCESSING APPARATUS, PROCESSING METHOD AND PROGRAM

(71) Applicant: Nippon Telegraph and Telephone Corporation, Tokyo (JP)

(72) Inventors: Takahide Hoshide, Musashino (JP); Masato Ono, Musashino (JP); Shinji Fukatsu, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 2 days.

(21) Appl. No.: 18/039,355

(22) PCT Filed: Dec. 3, 2020

(86) PCT No.: PCT/JP2020/045068
§ 371 (c)(1),
(2) Date: May 30, 2023

(87) PCT Pub. No.: WO2022/118434
PCT Pub. Date: Jun. 9, 2022

(65) Prior Publication Data
US 2023/0421718 A1    Dec. 28, 2023

(51) Int. Cl.
*H04N 5/265* (2006.01)

(52) U.S. Cl.
CPC ................. *H04N 5/265* (2013.01)

(58) Field of Classification Search
CPC ...... H04N 5/45; H04N 5/272; H04N 5/44504; H04N 5/445; H04N 5/262; H04N 5/265; H04N 9/74; H04N 9/76

USPC ........ 348/563–566, 584, 586, 588, 597–599, 348/659, 660
See application file for complete search history.

(56) References Cited

U.S. PATENT DOCUMENTS

2014/0184914 A1*  7/2014  Oshima ................. G09G 5/026
                                                     348/564

FOREIGN PATENT DOCUMENTS

JP          2019008582          1/2019

OTHER PUBLICATIONS

Wikipedia, "Alpha Blend," wikipedia.org, retrieved on Nov. 20, 2020, retrieved from URL <https://ja.wikipedia.org/wiki/アルファブレンド>, 3 pages (No Translation).

* cited by examiner

*Primary Examiner* — Sherrie Hsia
(74) *Attorney, Agent, or Firm* — Fish & Richardson P.C.

(57) ABSTRACT

A processing apparatus includes: an acquisition unit that acquires a plurality of pieces of frame data captured simultaneously from a plurality of pieces of video data captured while parts of capturing regions are superimposed; a specification unit that specifies a blend region which includes a pixel forming a seam line connecting the plurality of pieces of frame data and is provided in a direction in which the plurality of pieces of frame data overlap; and an output unit that outputs connected frame data F0 in which each pixel of the blend region has a pixel value obtained by blending pixel values of the plurality of pieces of frame data, and the plurality of pieces of frame data are connected by the seam line.

6 Claims, 9 Drawing Sheets

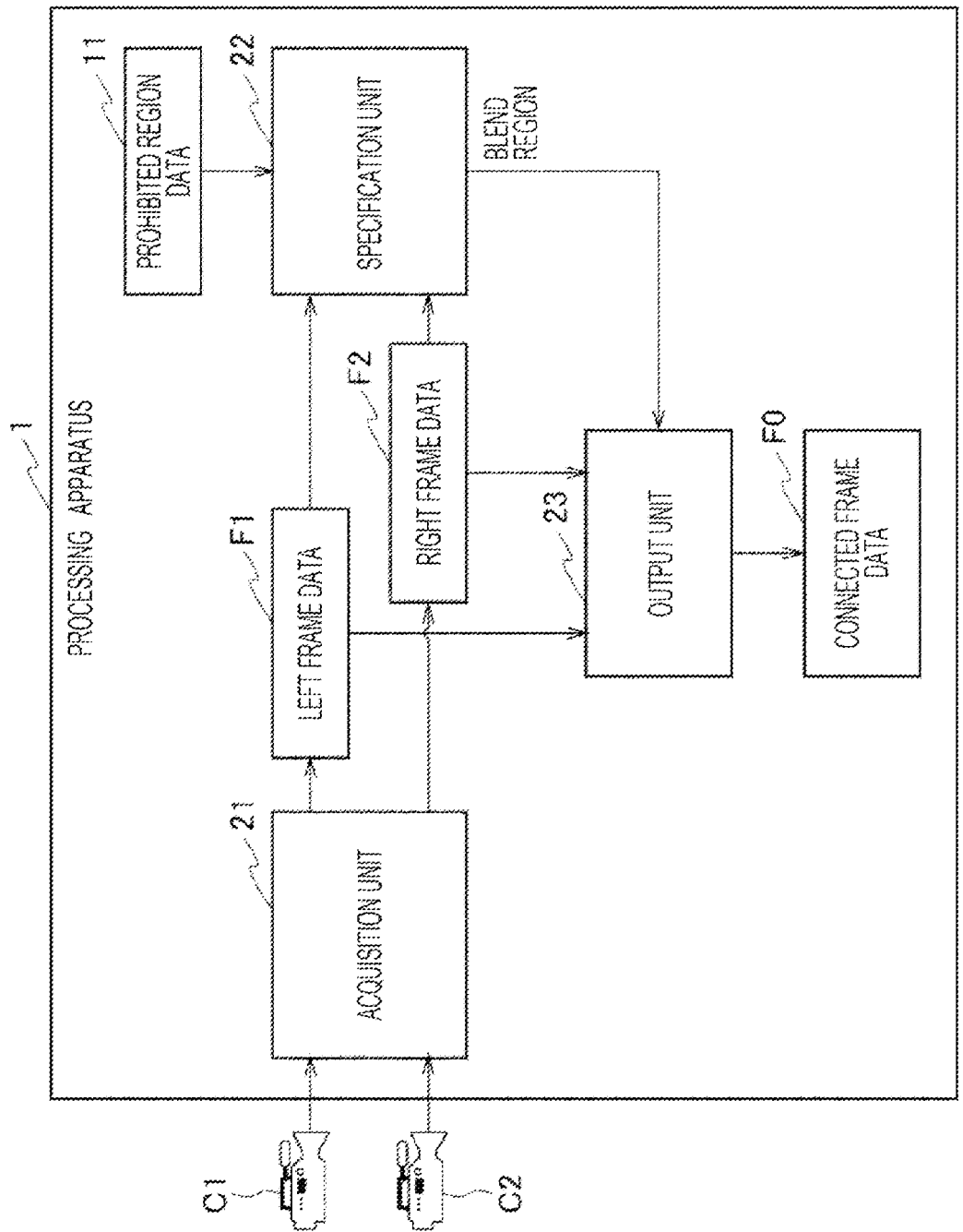

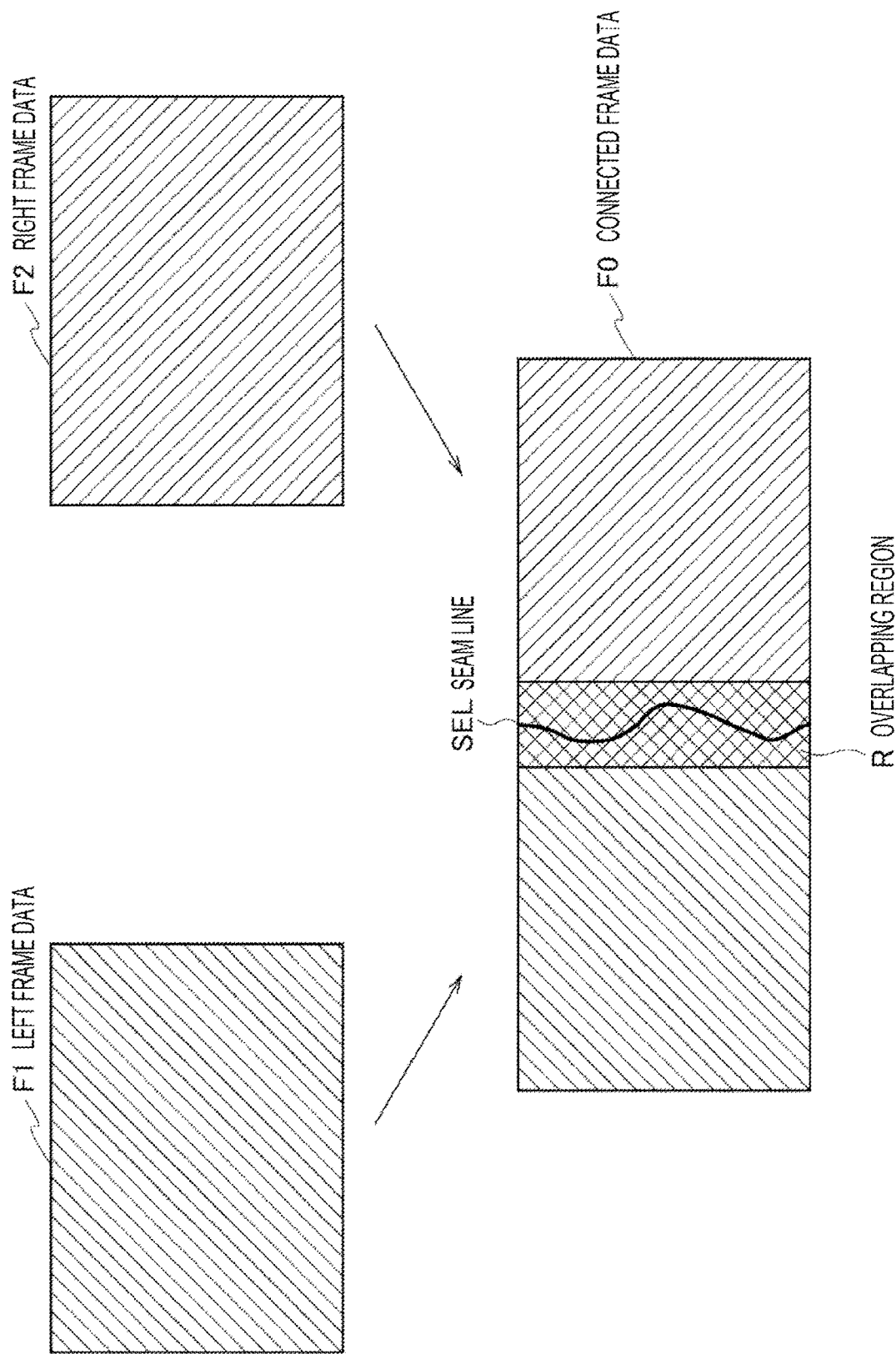

[Fig. 3]
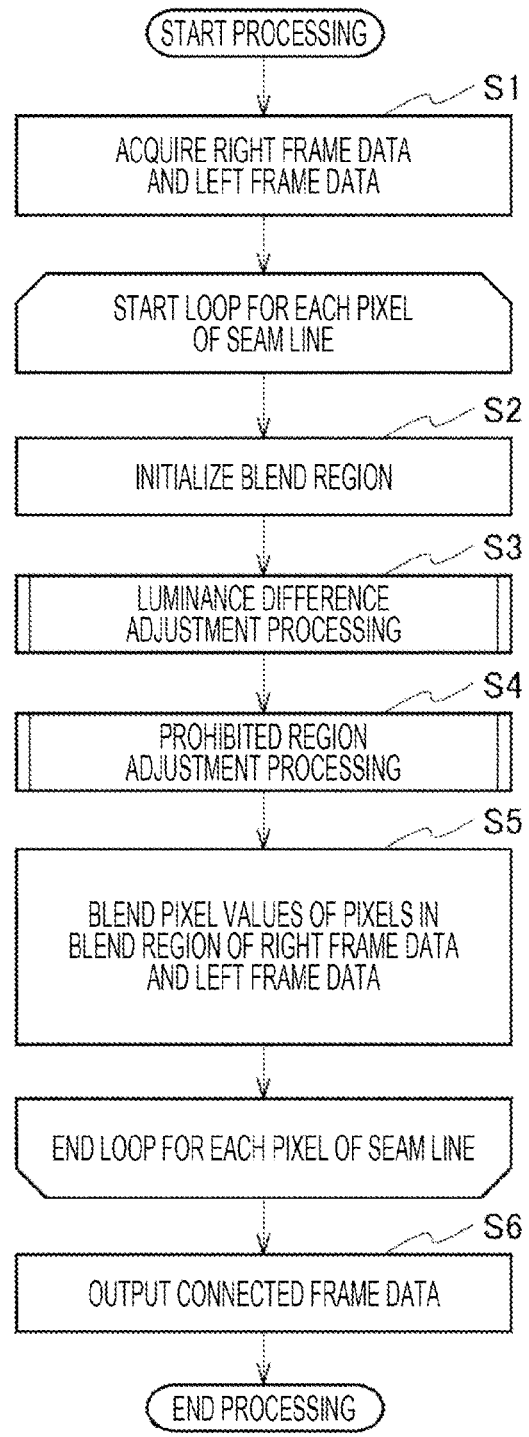

[Fig. 4]
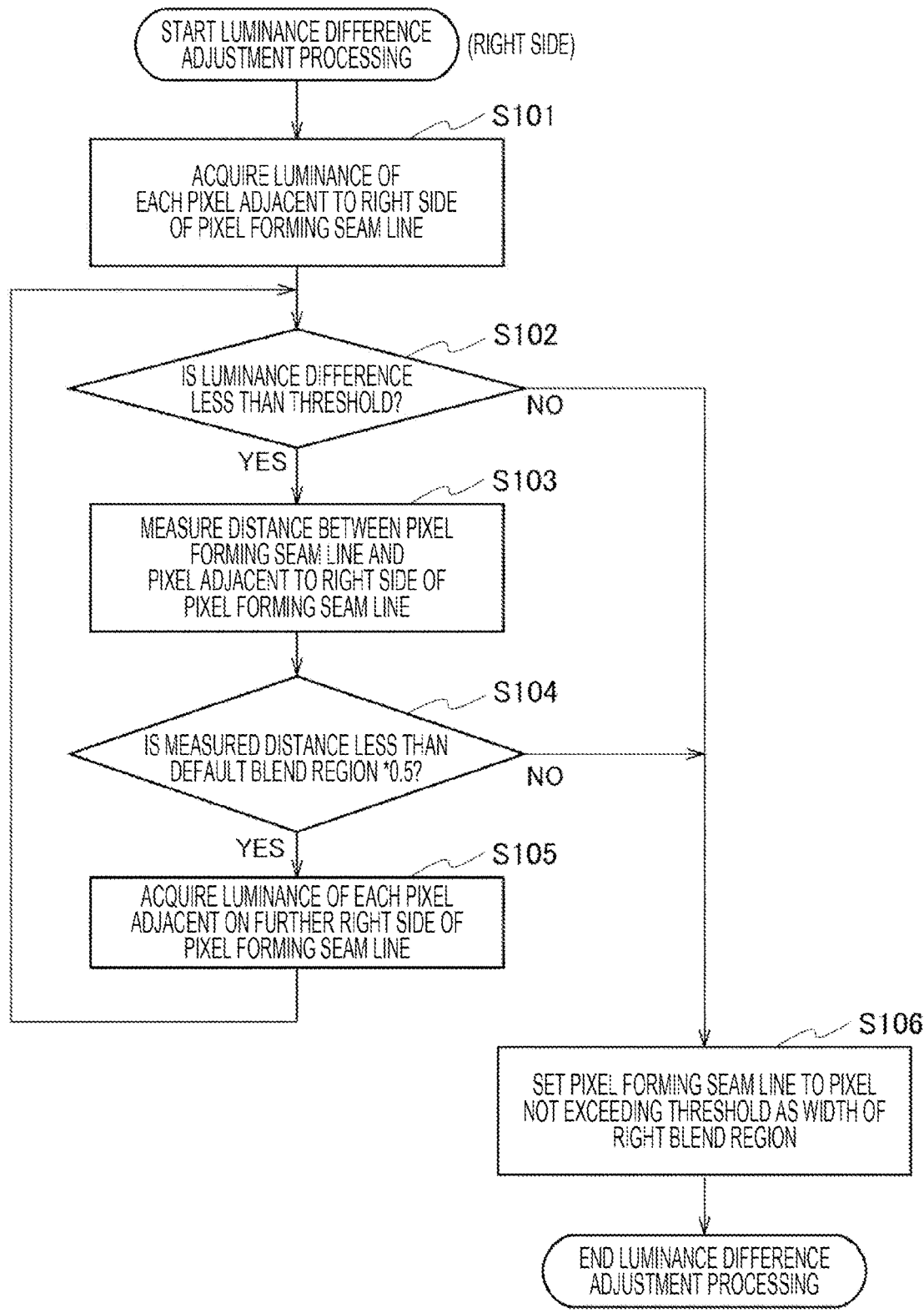

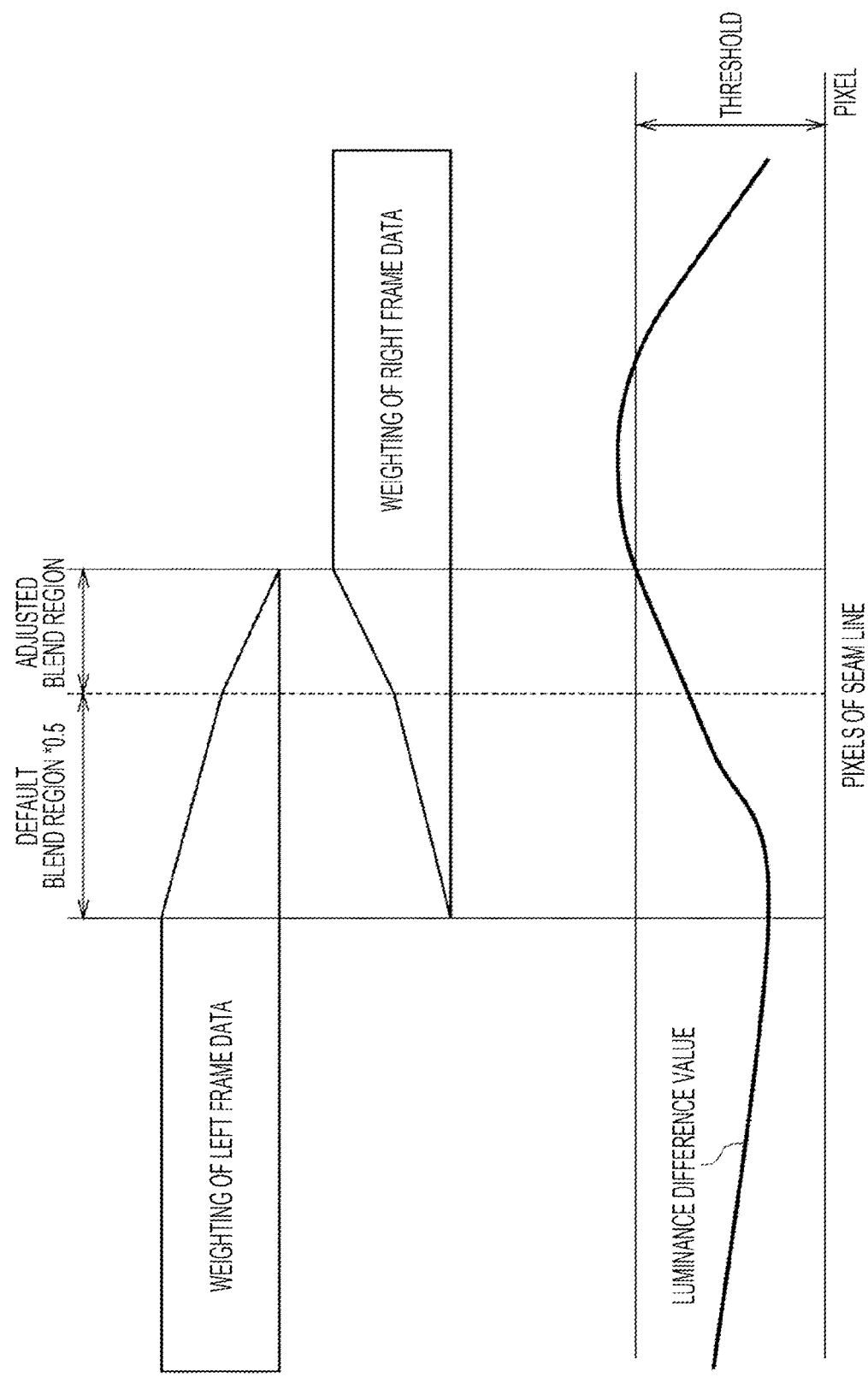
[Fig. 5]

[Fig. 6]
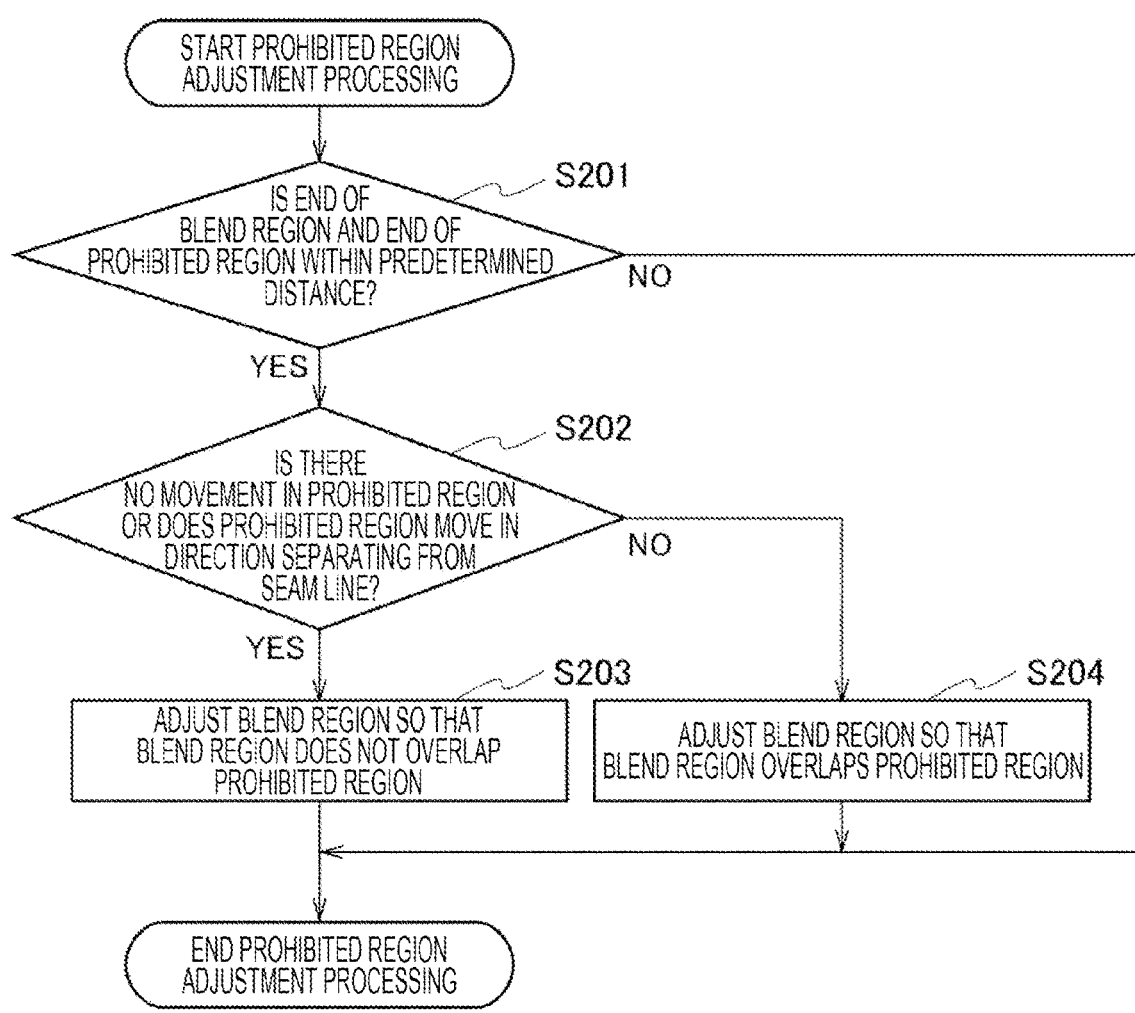

[Fig. 7]
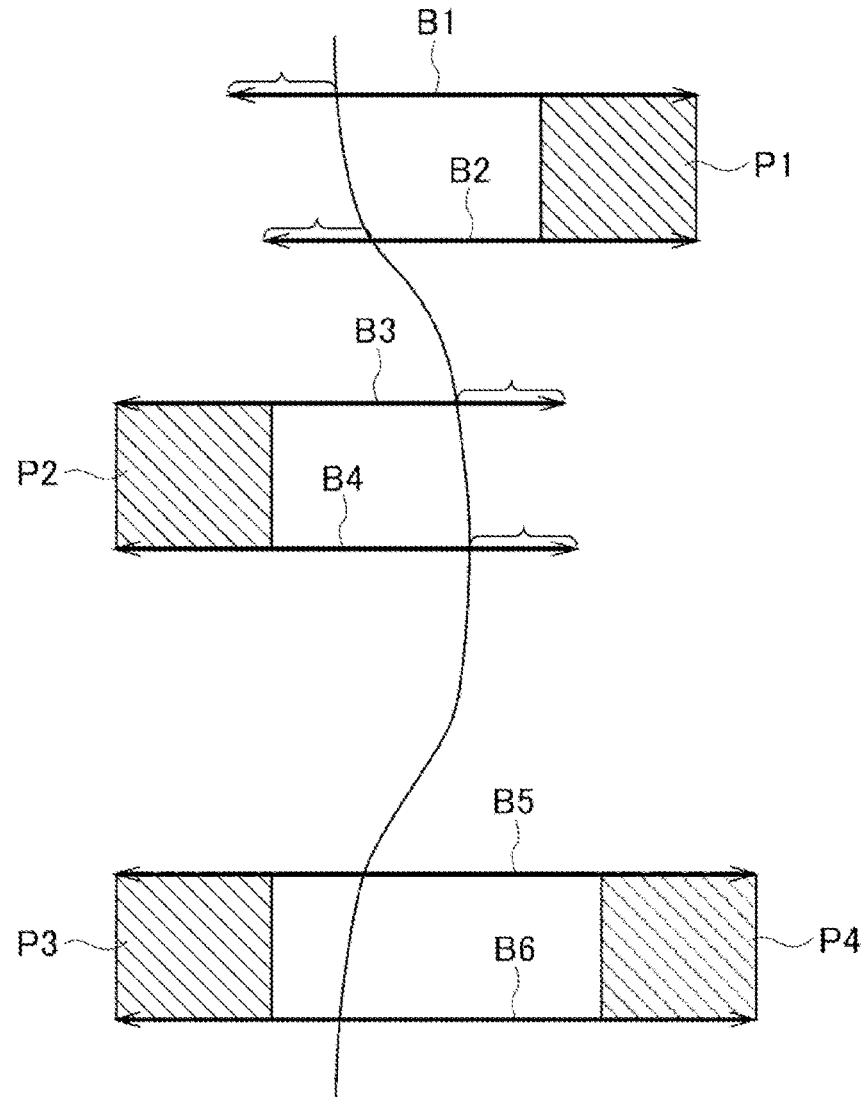

[Fig. 8]
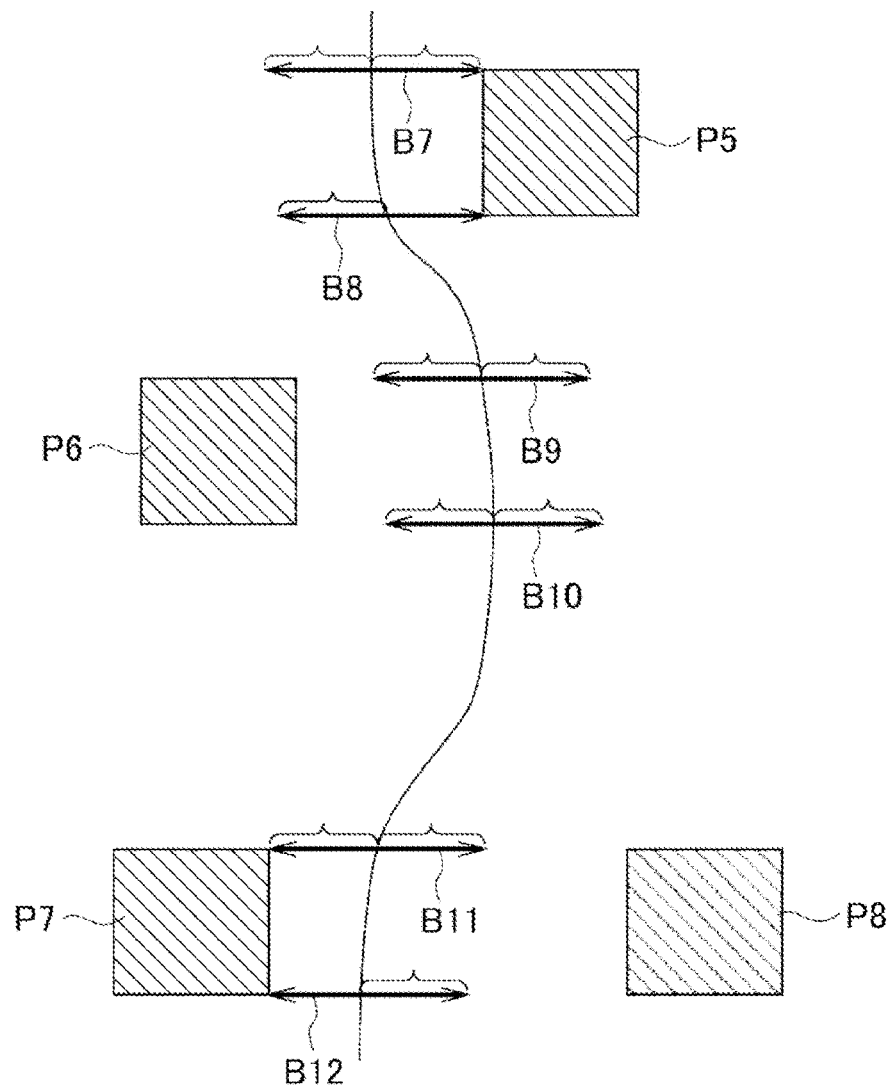

[Fig. 9]
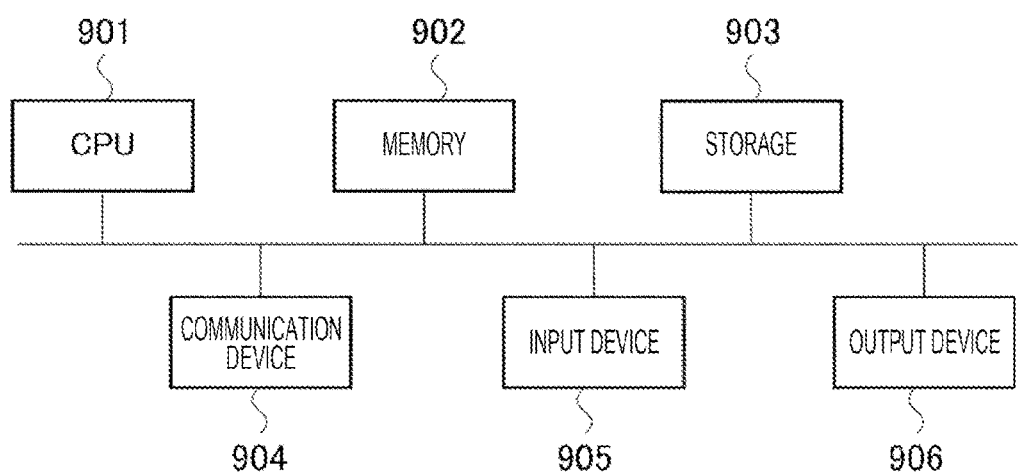

PROCESSING APPARATUS, PROCESSING METHOD AND PROGRAM

CROSS-REFERENCE TO RELATED APPLICATIONS

This application is a National Stage application under 35 U.S.C. § 371 of International Application No. PCT/JP2020/045068, having an International Filing Date of Dec. 3, 2020. The disclosure of the prior application is considered part of the disclosure of this application, and is incorporated by reference in its entirety into this application.

TECHNICAL FIELD

The present invention relates to a processing apparatus, a processing method, and a program.

BACKGROUND ART

A widescreen video having a resolution exceeding the resolution of one video element is widely used. A widescreen video is generated by combining videos each generated from one video element, for example, 4K. A widescreen video has a resolution, for example, 12K, higher than that of a video generated from one video element.

There is a method for achieving high-speed processing of connecting a plurality of pieces of video data in a vertical direction and a horizontal direction (Patent Literature 1). In Patent Literature 1, a pixel having a small difference in feature amount of an image is calculated as a seam line. In addition, alpha blending is known as a method of capturing one widescreen video using a plurality of projectors (Non Patent Literature 1). Alpha blending combines two images using a coefficient in a predetermined region including a seam line.

CITATION LIST

Patent Literature

Patent Literature 1: JP 2019-008582 A

Non Patent Literature

Non Patent Literature 1: Wikipedia, "alpha blend", [online], searched on Nov. 20, 2020, Internet <URL:https://ja.wikipedia.org/wiki/%E3%82%A2%E3%83%AB%E3%83%95%E3%82%A1%E3%83%96%E3%83%AC%E3%83%B3%E3%83%89>

SUMMARY OF INVENTION

Technical Problem

When blending a plurality of pieces of video data in a predetermined region including a seam line, there may be a problem that an object appears double or is missing. This may spoil a viewing experience such as a sense of immersion.

The present invention has been made in view of the above circumstances, and an object of the present invention is to provide a technique that enables blending of a plurality of pieces of video data in an appropriate region including a seam line.

Solution to Problem

A processing apparatus according to one aspect of the present invention includes an acquisition unit that acquires a plurality of pieces of frame data captured simultaneously from a plurality of pieces of video data captured while parts of capturing regions are superimposed, a specification unit that specifies a blend region which includes a pixel forming a seam line connecting the plurality of pieces of frame data and is provided in a direction in which the plurality of pieces of frame data overlap, and an output unit that outputs connected frame data in which each pixel of the blend region has a pixel value obtained by blending pixel values of the plurality of pieces of frame data, and the plurality of pieces of frame data are connected by the seam line. The specification unit specifies, as the blend region, consecutive pixels that include a pixel forming the seam line and in which a luminance difference between corresponding pixels of the plurality of pieces of frame data is within a predetermined value.

A processing method according to one aspect of the present invention includes the steps of acquiring, by a computer, a plurality of pieces of frame data captured simultaneously from a plurality of pieces of video data captured while parts of capturing regions are superimposed, specifying, by the computer, a blend region which includes a pixel forming a seam line connecting the plurality of pieces of frame data and is provided in an overlapping direction of the plurality of pieces of frame data, and outputting, by the computer, connected frame data in which each pixel of the blend region has a pixel value obtained by blending pixel values of the plurality of pieces of frame data and the plurality of pieces of frame data are connected by the seam line. The specifying step specifies, as the blend region, consecutive pixels that include a pixel forming the seam line and in which a luminance difference between corresponding pixels of the plurality of pieces of frame data is within a predetermined value.

One aspect of the present invention is a program that causes a computer to function as the above-described processing apparatus.

Advantageous Effects of Invention

According to the present invention, it is possible to provide a technique that enables blending of a plurality of pieces of video data in an appropriate region including a seam line.

BRIEF DESCRIPTION OF DRAWINGS

FIG. 1 is a diagram for describing functional blocks of a processing apparatus according to an embodiment of the present invention.

FIG. 2 is a diagram for describing connected frame data.

FIG. 3 is a flowchart for describing a processing method in the processing apparatus.

FIG. 4 is a flowchart for describing luminance difference adjustment processing performed by a specification unit.

FIG. 5 is a diagram for describing luminance difference adjustment processing.

FIG. 6 is a flowchart for describing prohibited region adjustment processing performed by the specification unit.

FIG. 7 is a diagram for describing a case where a blend region is extended in the prohibited region adjustment processing.

FIG. 8 is a diagram for describing a case where a blend region is reduced in the prohibited region adjustment processing.

FIG. 9 is a diagram for describing a hardware configuration of a computer used in the processing apparatus.

DESCRIPTION OF EMBODIMENTS

Hereinafter, an embodiment of the present invention will be described with reference to the drawings. In the drawings, the same parts are denoted by the same reference signs, and description thereof is omitted.

A processing apparatus 1 according to the embodiment of the present invention will be described with reference to FIG. 1. The processing apparatus 1 acquires a plurality of pieces of video data captured by a plurality of cameras C1 and C2 while parts of capturing regions of the cameras C1 and C2 are superimposed, and combines a plurality of pieces of frame data captured simultaneously. The processing apparatus 1 combines the pieces of frame data simultaneously captured, which are acquired from the pieces of video data, at a seam line of the pieces of frame data. The processing apparatus 1 reconstructs high-resolution video data by blending pixel values of a plurality of pieces of frame data in a blend region including a specified seam line.

In the embodiment of the present invention, the camera C1 and the camera C2 capture a video in capturing regions partially overlapping and adjacent to each other in the left-right direction. As illustrated in FIG. 2, the camera C1 captures a left frame data F1. The camera C2 captures a right frame data F2. The capturing region of the left frame data F1 and the capturing region of the right frame data F2 have an overlapping region R that partially overlaps. In the overlapping region R, a seam line SEL connecting the left frame data F1 and the right frame data F2 is specified. Further, a blend region including the seam line SEL is specified in the overlapping region R.

The seam line SEL is formed in a direction intersecting the overlapping direction of the plurality of pieces of frame data. The processing apparatus 1 specifies a blend region in the overlapping direction for each pixel forming the seam line SEL. In the example illustrated in FIG. 2, since the plurality of pieces of frame data overlap in the left-right direction, the seam line SEL is formed in the up-down direction. The seam line SEL is specified by a set of pixels selected from each row of the overlapping region R of the left frame data F1 and the right frame data F2. For each pixel forming the seam line SEL, the processing apparatus 1 specifies a blend region including the pixel and formed by a plurality of pixels in the same row as the pixel.

While the embodiment of the present invention describes a case where a plurality of pieces of frame data are adjacent to each other in the left-right direction, the present invention is not limited thereto. The plurality of pieces of frame data may be adjacent to each other in the up-down direction, or may be adjacent to each other in both the left-right direction and the up-down direction.

As illustrated in FIG. 1, the processing apparatus 1 includes data of the left frame data F1, the right frame data F2, connected frame data F0, and prohibited region data 11, and functions of an acquisition unit 21, a specification unit 22, and an output unit 23. Each piece of data is stored in a memory 902 or a storage 903. Each function is implemented by a CPU 901.

As described with reference to FIG. 2, the left frame data F1 and the right frame data F2 are data of one frame, captured at the same time, of each piece of video data captured by the camera C1 and the camera C2, respectively. The capturing region of the left frame data F1 and the capturing region of the right frame data F2 are adjacent to each other in the left-right direction and partially overlap.

The connected frame data F0 is frame data generated by connecting the left frame data F1 and the right frame data F2. The connected frame data F0 is generated by connecting the left frame data F1 and the right frame data F2 at predetermined positions and blending the pixel values of pixels in a surrounding blend region.

The prohibited region data 11 specifies a prohibited region set in each of the left frame data F1 and the right frame data F2. The prohibited region is excluded when a seam line is formed. The seam line SEL is formed in a region other than the prohibited region. The prohibited region is specified by, for example, an identifier of a pixel in which it is not preferable to form a seam line, such as a pixel forming an object. The prohibited region is set in advance through analysis of the left frame data F1 and the right frame data F2, for example.

The prohibited region data 11 specifies at least a prohibited region set in the overlapping region R of the left frame data F1 and the right frame data F2 to be the target of blend width calculation. The prohibited region data 11 may include not only the identifiers of pixels in the prohibited region set in the overlapping region R of the left frame data F1 and the right frame data F2, but also the identifiers of pixels in the prohibited regions in the preceding and subsequent frame data.

The acquisition unit 21 acquires a plurality of pieces of frame data simultaneously captured from a plurality of pieces of video data captured while parts of capturing regions are superimposed. The acquisition unit 21 acquires the left frame data F1 and the right frame data F2 simultaneously captured from the video data captured by the camera C1 and the video data captured by the camera C2.

The specification unit 22 specifies a blend region which includes pixels forming a seam line connecting a plurality of pieces of frame data and is provided in the overlapping direction of the plurality of pieces of frame data. The seam line is calculated using a general method. The specification unit 22 specifies a blend region for each pixel forming the seam line. In principle, the specification unit 22 sets a set of a predetermined number of pixels in the overlapping direction around a pixel forming the seam line as a default blend region.

As described later, the specification unit 22 may adjust the blend region by extending or reducing depending on the situation in or near the blend region. In the embodiment of the present invention, the specification unit adjusts the blend region through (1) adjustment using the luminance difference and (2) adjustment using the prohibited region.

The output unit 23 outputs the connected frame data F0 in which each pixel of the blend region has a pixel value obtained by blending pixel values of a plurality of pieces of frame data and the plurality of pieces of frame data are connected at a seam line. The output unit 23 connects the left frame data F1 and the right frame data F2 at a seam line. The output unit 23 blends the pixel values of corresponding pixels of the left frame data F1 and the right frame data F2 in each pixel of the blend region specified by the specification unit 22, and reflects the blended pixel value in the connected frame data F0. The corresponding pixels of the left frame data F1 and the right frame data F2 are pixels having a common capturing region.

Here, the pixel value is a feature value of a color of each pixel of each piece of frame data. A pixel value is, for example, each value of RGB (red, green, and blue), each value of CMY (cyan, magenta, and yellow), each value of YUV (luminance signal, difference between luminance signal and blue component, and difference between luminance signal and red component), or the like. The output unit 23 blends pixel values of the blend region using a general method such as alpha blending or multi-hand blending. For example, the output unit 23 may set the average of the corresponding pixel values of the left frame data F1 and the right frame data F2 in the blend region as the value of the corresponding pixel of the connected frame data F0. In addition, the output unit 23 may set the ratio of the corresponding pixels of the left frame data F1 and the right frame data F2 within the blend region as in alpha blending, and may use the ratio to set the value of the corresponding pixel of the connected frame data F0.

An outline of processing performed by the processing apparatus 1 will be described with reference to FIG. 3. The order of the processing illustrated in FIG. 3 is an example, and the present invention is not limited thereto. For example, while a case where (1) adjustment using the luminance difference is performed in step S3 and then (2) adjustment using the prohibited region is performed in step S4 will be described, the processing may be performed in the reverse order.

First, in step S1, the processing apparatus 1 acquires the right frame data F2 and the left frame data F1. The processing of steps S2 to S5 is repeated for each pixel of a seam line combining the right frame data F2 and the left frame data F1.

In step S2, the processing apparatus 1 sets a default blend region for processing target pixels and initializes the blend region. In step S3, the processing apparatus 1 performs luminance difference adjustment processing. The processing of step S3 will be described in detail with reference to FIG. 4. In step S4, the processing apparatus 1 performs prohibited region adjustment processing. The processing of step S4 will be described in detail with reference to FIG. 6. In step S5, the processing apparatus 1 blends pixel values of corresponding pixels of the left frame data F1 and the right frame data F2 in the blend region adjusted in steps S3 and S4.

When the processing of steps S2 to S5 is completed for each pixel forming the seam line, the processing apparatus 1 outputs the connected frame data F0 in step S6.

A case will be described where the specification unit 22 adjusts the blend region through (1) adjustment using the luminance difference or (2) adjustment using the prohibited region depending on the situation in or near the blend region.

First, (1) adjustment using the luminance difference will be described.

The specification unit 22 specifies, as the blend region, consecutive pixels that include a pixel forming a seam line and in which the luminance difference between the corresponding pixels of a plurality of pieces of frame data is within a predetermined value. The specification unit 22 specifies, as the blend region, consecutive pixels having a small luminance difference between corresponding pixels of the left frame data F1 and the right frame data F2 in the overlapping region R. The processing apparatus 1 can generate the connected frame data F0 in which the seam line of frame data is inconspicuous.

In a default blend region set to include pixels forming a seam line, the specification unit 22 specifies, as the blend region, consecutive pixels that include a pixel forming a seam line and in which the luminance difference between the corresponding pixels of a plurality of pieces of frame data is within a predetermined value. The specification unit 22 determines whether or not there is a luminance difference of a predetermined value or more between corresponding pixels of the left frame data F1 and the right frame data F2 in the default blending region. The specification unit 22 excludes, from the blend region, a pixel outside of the pixel having a luminance difference of a predetermined value or more with respect to the seam line. As a result, consecutive pixels having a luminance difference within a predetermined value in the default blend region are specified, so that the blend region can be limited and the calculation cost can be reduced.

The luminance difference adjustment processing in the specification unit 22 will be described with reference to FIG. 4. The order of the processing illustrated in FIG. 4 is an example, and the present invention is not limited thereto.

First, in step S101, the specification unit 22 acquires the luminance of each pixel on the right side of a pixel forming the seam line in the right frame data F2 and the left frame data F1. In step S102, it is determined whether or not the luminance difference between pixels acquired in step S101 is less than a threshold. If the luminance difference exceeds the threshold, the processing proceeds to step S106, whereas if the luminance difference does not exceed the threshold, the processing proceeds to step S103.

In step S103, the specification unit 22 measures the distance between the pixel forming the seam line and the pixel adjacent to the right side of the pixel forming the seam line. In step S104, the specification unit 22 determines whether or not the distance measured in step S103 is shorter than the default blend region *0.5, specifically, the default blend region set on the right side. If the distance is less than the default blend region *0.5, the processing proceeds to step S106.

If the distance is not less than the default blend region *0.5, the specification unit 22 acquires the luminance of each pixel adjacent on the further right side of the pixel forming the seam line in step S105, and the processing proceeds to step S102.

In step S106, the specification unit 22 sets the width from the pixel forming the seam line to the pixel whose luminance difference does not exceed the threshold, as the width of the right blend region.

Note that the processing illustrated in FIG. 4 is executed for each of both sides of the seam line in the overlapping direction. Note that when the processing is executed for a pixel on the left side, "right side" in step S101 and other steps is changed to "left side".

Details will be described with reference to FIG. 5. In the graph illustrated in FIG. 5, the left-right direction is the arrangement of pixels in a row including pixels forming a seam line. The up-down direction is a difference value of the luminance of the corresponding pixels of the left frame data F1 and the right frame data F2.

There is no pixel whose luminance difference value exceeds the threshold on the left side of the pixel forming the seam line in the default blend region. On the left side of the pixel forming the seam line, the default blend region *0.5 is set as the blend region.

On the right side of the pixel forming the seam line in the default blend region, there is a pixel whose luminance difference value exceeds the threshold. On the right side of the pixel forming the seam line, the pixel forming the seam line to the pixel having the luminance difference value exceeding the threshold are set as the blend region.

In a case where the weighting of blending of the pixel of the left frame data F1 and the pixel of the right frame data F2 is set as in alpha blending, the weighting of each frame data is determined in each blend region of the right side and the left side. In the pixels forming the seam line, the weighting of the left frame data F1 and the right frame data F2 is the same.

On the left side of the pixel forming the seam line, the weighting of the left frame data F1 for the pixel group in the width of the default blend region *0.5 changes from 50% to 100%. On the right side of the pixel forming the seam line, the weighting of the left frame data F1 of for the pixel group from the pixel forming the seam line to the pixel having the luminance difference value exceeding the threshold changes from 50% to 0%. As another example, the weighting may be set so as to uniformly change from 100% to 0% in the blend region.

By excluding pixels having a large luminance difference and blending pixel values of a plurality of pieces of frame data, it is possible to combine a plurality of pieces of frame data without making the seam line and the periphery thereof stand out.

Next, (2) adjustment using the prohibited region will be described.

In a case where the distance between an end of a blend region and an end of a prohibited region excluded at the time of forming a seam line is within a predetermined distance and the blend region and the prohibited region overlap in the subsequent frame data, the specification unit 22 adjusts the blend region so that the blend region overlaps the prohibited region. On the other hand, in a case where the blend region and the prohibited region do not overlap, the specification unit 22 adjusts the blend region so that the blend region does not overlap the prohibited region. In a case where the prohibited region moves in the direction toward the seam line in the subsequent frame data, the specification unit 22 determines that the blend region and the prohibited region overlap. In a case where the prohibited region moves in the direction away from the seam line in the subsequent frame data or there is no movement, the specification unit 22 determines that the blend region and the prohibited region do not overlap.

Here, the case where the distance between an end of a blend region and an end of a prohibited region excluded at the time of forming a seam line is within a predetermined distance includes a case where the blend region and the prohibited region overlap. The specification unit 22 may adjust a default blend region according to the position of a prohibited region, or may further adjust a blend region, which has been adjusted using luminance difference adjustment, according to the position of a prohibited region.

A prohibited region is a pixel group excluded at the time of forming a seam line, and is provided in a region that is conspicuous in the frame data, such as pixels forming an object. When a prohibited region is set as a blend region, visibility is deteriorated such as blurring of an object. Meanwhile, since the prohibited region is set for each piece of frame data, there may be a situation in which overlap of the prohibited region and the blend region is unavoidable, depending on the arrangement position of the prohibited region. Furthermore, when viewing continuous frame data, there may be a case where the drawn state of an object changes in the middle of viewing, such as when a blend region is provided in the drawing range of the object in the middle of viewing, or when a blend region provided in the drawing range of the object deviates from the object. Setting the blend region without considering the prohibited region may cause significant deterioration in visibility.

Therefore, when an end of a blend region and an end of a prohibited region are close to each other, the specification unit 22 adjusts the blend region according to whether or not the prohibited region approaches the seam line in the frame data after the frame data to be processed. When the prohibited region approaches the seam line, the blend region is extended so as to overlap the prohibited region. The distance overlapping the prohibited region may be a predetermined value or may be calculated from the movement of the prohibited region in the subsequent frame data. On the other hand, when the prohibited region does not approach the seam line, specifically, when the prohibited region moves away from the seam line or the prohibited region stops, the specification unit 22 reduces and provides the blend region so as not to overlap the prohibited region.

As a result, the specification unit 22 can set the blend region so that the blend region does not enter or deviate from the drawing range of the object in consecutive pieces of frame data, whereby deterioration in visibility can be avoided.

The prohibited region adjustment processing in the specification unit 22 will be described with reference to FIG. 6. The order of the processing illustrated in FIG. 6 is an example, and the present invention is not limited thereto.

In step S201, the specification unit 22 determines whether or not an end of a blend region and an end of a prohibited region are within a predetermined distance. If the distance is not within the predetermined distance, the processing is terminated.

If the distance is within the predetermined distance, in step S202, if there is no movement of the prohibited region in the subsequent frame data, or if the prohibited region moves in a direction separating from the seam line, the specification unit 22 proceeds to step S203. In step S203, the specification unit 22 adjusts the blend region so that the blend region does not overlap the prohibited region.

On the other hand, if there is movement in the prohibited region and the movement is in a direction approaching the seam line, the processing proceeds to step S204. In step S204, the specification unit 22 adjusts the blend region so that the blend region overlaps the prohibited region.

Details will be described with reference to FIG. 7. A case where a blend region is provided to extend to a prohibited region will be described in FIG. 7.

A prohibited region P1 is formed on the right side of a seam line. Blend regions B1 and B2 have a distance of the default blend width *0.5 on the left side of the seam line, and extend into the prohibited region on the right side of the seam line.

A prohibited region P2 is formed on the left side of the seam line. Blend regions B3 and B4 extend into the prohibited region on the left side of the seam line, and have a distance of the default blend width *0.5 on the right side.

Prohibited regions P3 and P4 are formed on the left and right sides of the seam line, respectively. Both of blend regions B5 and B6 extend into the prohibited regions.

Details will be described with reference to FIG. 8. In FIG. 8, a case where the blend region is reduced so as not to overlap the prohibited region will be described.

A prohibited region P5 is formed on the right side of the seam line. A blend region B7 has a distance of the default blend width *0.5 in each of the left and right directions of the seam line. A blend region B8 has a distance of the default blend width *0.5 on the left side of the seam line and a distance shorter than the default blend width *0.5 on the right side of the seam line.

A prohibited region P6 is formed on the left side of the seam line and is formed away from the seam line by more than a predetermined distance. Blend regions B9 and B10 have a distance of the default blend width *0.5 in both the left and right directions of the seam line.

Prohibited regions P7 and P8 are formed on the left and right of the seam line, respectively. A blend region B11 has a distance of the default blend width *0.5 in both the left and right directions of the seam line. When the distance between the prohibited region P7 and the seam line is short on the left side and the prohibited region P7 does not approach the seam line, a blend region B12 has a distance shorter than the default blend width *0.5 on the left side of the seam line. On the right side, the blend region B12 has a distance of the default blend width *0.5.

As described above, the processing apparatus 1 according to the embodiment of the present invention extends or reduces the blend region provided around the seam line depending on the situation of each frame data, thereby blending a plurality of pieces of video data in an appropriate region including the seam line. The processing apparatus 1 can curb deterioration in visibility due to the blending region.

The processing apparatus 1 of the present embodiment described above is, for example, a general-purpose computer system including a central processing unit (CPU, processor) 901, the memory 902, the storage 903 (hard disk drive (HDD), solid state drive (SSD)), a communication device 904, an input device 905, and an output device 906. In the computer system, each function of the processing apparatus 1 is implemented by the CPU 901 executing a predetermined program loaded on the memory 902.

Note that the processing apparatus 1 may be implemented by one computer, or may be implemented by a plurality of computers. In addition, the processing apparatus 1 may be a virtual machine that is implemented in a computer.

The program of the processing apparatus 1 can be stored in a computer-readable recording medium such as an HDD, an SSD, a universal serial bus (USB) memory, a compact disc (CD), or a digital versatile disc (DVD), or can be distributed via a network.

Note that the present invention is not limited to the above embodiment, and various modifications can be made within the scope of the gist of the present invention.

REFERENCE SIGNS LIST

1 Processing apparatus
11 Prohibited region data
21 Acquisition unit
22 Specification unit
23 Output unit
901 CPU
902 Memory
903 Storage
904 Communication device
905 Input device
906 Output device
F0 connected frame data
F1 Left frame data
F2 Right frame data
R Overlapping region
SEL Seam line

The invention claimed is:

1. A processing apparatus comprising:
an acquisition unit, comprising one or more processors, configured to, acquire a plurality of pieces of frame data captured simultaneously from a plurality of pieces of video data captured while parts of capturing regions are superimposed;
a specification unit, comprising one or more processors, configured to, specify a blend region which includes a pixel forming a seam line connecting the plurality of pieces of frame data and is provided in a direction in which the plurality of pieces of frame data overlap; and
an output unit, comprising one or more processors, configured to, output connected frame data in which each pixel of the blend region has a pixel value obtained by blending pixel values of the plurality of pieces of frame data, and the plurality of pieces of frame data are connected by the seam line, wherein
the specification unit is configured to specify, as the blend region, consecutive pixels that include a pixel forming the seam line and in which a luminance difference between corresponding pixels of the plurality of pieces of frame data is within a predetermined value.

2. The processing apparatus according to claim 1, wherein in a default blend region set to include a pixel forming the seam line, the specification unit is configured to specify, as the blend region, consecutive pixels that include the pixel forming the seam line and in which a luminance difference between the corresponding pixels of the plurality of pieces of frame data is within a predetermined value.

3. The processing apparatus according to claim 1, wherein in a case where a distance between an end of the blend region and an end of a prohibited region excluded at a time of forming the seam line is within a predetermined distance and the blend region and the prohibited region overlap in subsequent frame data, the specification unit configured to adjust the blend region so that the blend region overlaps the prohibited region, and in a case where the blend region and the prohibited region do not overlap, the specification unit configured to adjust the blend region so that the blend region does not overlap the prohibited region.

4. The processing apparatus according to claim 3, wherein in a case where the prohibited region moves in a direction toward the seam line in subsequent frame data, the specification unit configured to determine that the blend region and the prohibited region overlap.

5. A processing method comprising:
acquiring, by a computer, a plurality of pieces of frame data captured simultaneously from a plurality of pieces of video data captured while parts of capturing regions are superimposed;
specifying, by the computer, a blend region which includes a pixel forming a seam line connecting the plurality of pieces of frame data and is provided in a direction in which the plurality of pieces of frame data overlap; and
outputting, by the computer, connected frame data in which each pixel of the blend region has a pixel value obtained by blending pixel values of the plurality of pieces of frame data, and the plurality of pieces of frame data are connected by the seam line, wherein
specifying, as the blend region, consecutive pixels that include pixels a pixel forming the seam line and in which a luminance difference between corresponding pixels of the plurality of pieces of frame data is within a predetermined value.

6. A non-transitory, computer readable medium storing one or more instructions executable by a computer system to perform operations comprising
acquiring, by a computer, a plurality of pieces of frame data captured simultaneously from a plurality of pieces of video data captured while parts of capturing regions are superimposed;

specifying, by the computer, a blend region which includes a pixel forming a seam line connecting the plurality of pieces of frame data and is provided in a direction in which the plurality of pieces of frame data overlap; and outputting, by the computer, connected frame data in which each pixel of the blend region has a pixel value obtained by blending pixel values of the plurality of pieces of frame data, and the plurality of pieces of frame data are connected by the seam line, wherein specifying, as the blend region, consecutive pixels that include pixels a pixel forming the seam line and in which a luminance difference between corresponding pixels of the plurality of pieces of frame data is within a predetermined value.

* * * * *